(12) United States Patent (10) Patent No.: US 11,495,023 B2
Nishiguchi et al. (45) Date of Patent: Nov. 8, 2022

(54) MOVING IMAGE ANALYSIS APPARATUS, SYSTEM, AND METHOD

(71) Applicant: SOCIONEXT INC., Kanagawa (JP)

(72) Inventors: Yasuo Nishiguchi, Yokohama (JP); Yasuhiro Wakimoto, Yokohama (JP); Yuya Tagami, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 74 days.

(21) Appl. No.: 16/913,853

(22) Filed: Jun. 26, 2020

(65) Prior Publication Data

US 2020/0327332 A1 Oct. 15, 2020

Related U.S. Application Data

(63) Continuation of application No. PCT/JP2018/000029, filed on Jan. 4, 2018.

(51) Int. Cl.
  *G06V 20/40* (2022.01)
  *G06K 9/62* (2022.01)
  *G06T 9/00* (2006.01)

(52) U.S. Cl.
  CPC .......... *G06V 20/46* (2022.01); *G06K 9/6256* (2013.01); *G06T 9/00* (2013.01)

(58) Field of Classification Search
  CPC ..... G06K 9/00744; G06K 9/6256; G06T 9/00
  USPC ........................................................ 382/103
  See application file for complete search history.

(56) References Cited

U.S. PATENT DOCUMENTS

| 2010/0290672 A1* | 11/2010 | Nishino | .................. | G01P 13/00 |
| | | | | 382/103 |
| 2012/0237086 A1* | 9/2012 | Kourogi | .................. | G01S 11/12 |
| | | | | 382/103 |
| 2013/0034266 A1* | 2/2013 | Shamir | .................... | G06T 7/292 |
| | | | | 382/103 |

(Continued)

FOREIGN PATENT DOCUMENTS

| JP | H11-113002 A | 4/1999 |
| JP | 2009-049949 A | 3/2009 |

(Continued)

OTHER PUBLICATIONS

International Search Report and Written Opinion issued in corresponding International Patent Application No. PCT/JP2018/000029 dated Mar. 20, 2018, with partial English translation.

(Continued)

*Primary Examiner* — Ayodeji O Ayotunde
(74) *Attorney, Agent, or Firm* — McDermott Will & Emery LLP

(57) ABSTRACT

A moving image analysis apparatus includes at least one of a processor and a circuitry configured to perform operations including acquiring first data and second data used in processing, in which a moving image is compressed and encoded, for a first frame and a second frame, respectively, included in the moving image, detecting first feature data indicating a first feature of the moving image on the basis of the first frame and the first data and detecting second feature data indicating a second feature of the moving image on the basis of the second frame and the second data, and detecting an object included in the first frame on the basis of the first feature data and the second feature data.

12 Claims, 10 Drawing Sheets

(56) References Cited

U.S. PATENT DOCUMENTS

| | | | |
|---|---|---|---|
| 2013/0147843 A1 | 6/2013 | Shimizu | |
| 2014/0146876 A1* | 5/2014 | Takehara | H04N 19/147 375/240.02 |
| 2016/0080760 A1* | 3/2016 | Nakaishi | H04N 19/57 375/240.16 |

FOREIGN PATENT DOCUMENTS

| | | |
|---|---|---|
| JP | 2011-182356 A | 9/2011 |
| JP | 2012-099940 A | 5/2012 |
| JP | 2014-158164 A | 8/2014 |
| WO | 2013/011608 A1 | 1/2013 |
| WO | 2016/088583 A1 | 6/2016 |

OTHER PUBLICATIONS

Satoshi Hikida, "Scene Recognition for Digital Cameras with Deep Learning Technology," Ricoh Technical Report No. 42, 2017, with English Abstract.

K. Fukuda et al., "To propose a story model for the purpose of automatically generating stories," Collection of Presentation Papers at the 22nd Annual Meeting of the Society of Language Processing Science, 2016, with Partial English Translation.

Japanese Office Action issued in corresponding Japanese Patent Application No. 2019-563721 dated Aug. 9, 2022, with English translation.

\* cited by examiner

| SECTION OF FRAME | FRAME A TO FRAME B | FRAME B TO FRAME C | ... |
|---|---|---|---|
| SCENE | SCENE A | ... | ... |
| OBJECT ID | OBJECT A, OBJECT B, ... | ... | ... |
| LOCATION | IN A ROOM | ... | ... |
| ACTION | TALKING | ... | ... |
| EMOTION | CALM | ... | ... |
| ... | ... | ... | ... |

FIG.9B

| OBJECT ID | NAME | AGE | SEX | ... |
|---|---|---|---|---|
| OBJECT A | NAME A | AGE A | MALE | ... |
| ... | ... | ... | ... | ... |

902

MOVING IMAGE ANALYSIS APPARATUS, SYSTEM, AND METHOD

CROSS-REFERENCE TO RELATED APPLICATION

This application is a continuation application of International application PCT/JP2018/000029 filed on Jan. 4, 2018 and designated the U.S., the entire content of which is incorporated herein by reference.

FIELD

The present invention relates to a moving image analysis apparatus, a moving image analysis system, a moving image analysis method, and a non-transitory computer-readable recording medium.

BACKGROUND

Conventionally, a technique for detecting an object inappropriate for distribution from a moving image (video) taken by a surveillance camera, a camera for television broadcasting, a camera of a smartphone, and the like is known as disclosed in, for example, Japanese Laid-open Patent Publication No. 2009-049949 and International Publication Pamphlet No. WO2016/088583.

SUMMARY

According to one aspect, a moving image analysis apparatus includes at least one of a processor and a circuitry configured to perform operations including acquiring first data and second data used in processing, in which a moving image is compressed and encoded, for a first frame and a second frame, respectively, included in the moving image, detecting first feature data indicating a first feature of the moving image on the basis of the first frame and the first data and detecting second feature data indicating a second feature of the moving image on the basis of the second frame and the second data, and detecting an object included in the first frame on the basis of the first feature data and the second feature data.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIG. 9A is a drawing for explaining an example of scene data; and

FIG. 9B is a drawing for explaining an example of object data.

DESCRIPTION OF EMBODIMENT

Hereinafter, an embodiment of the present invention will be described with reference to the drawings.

<System Configuration>

Figure 1:
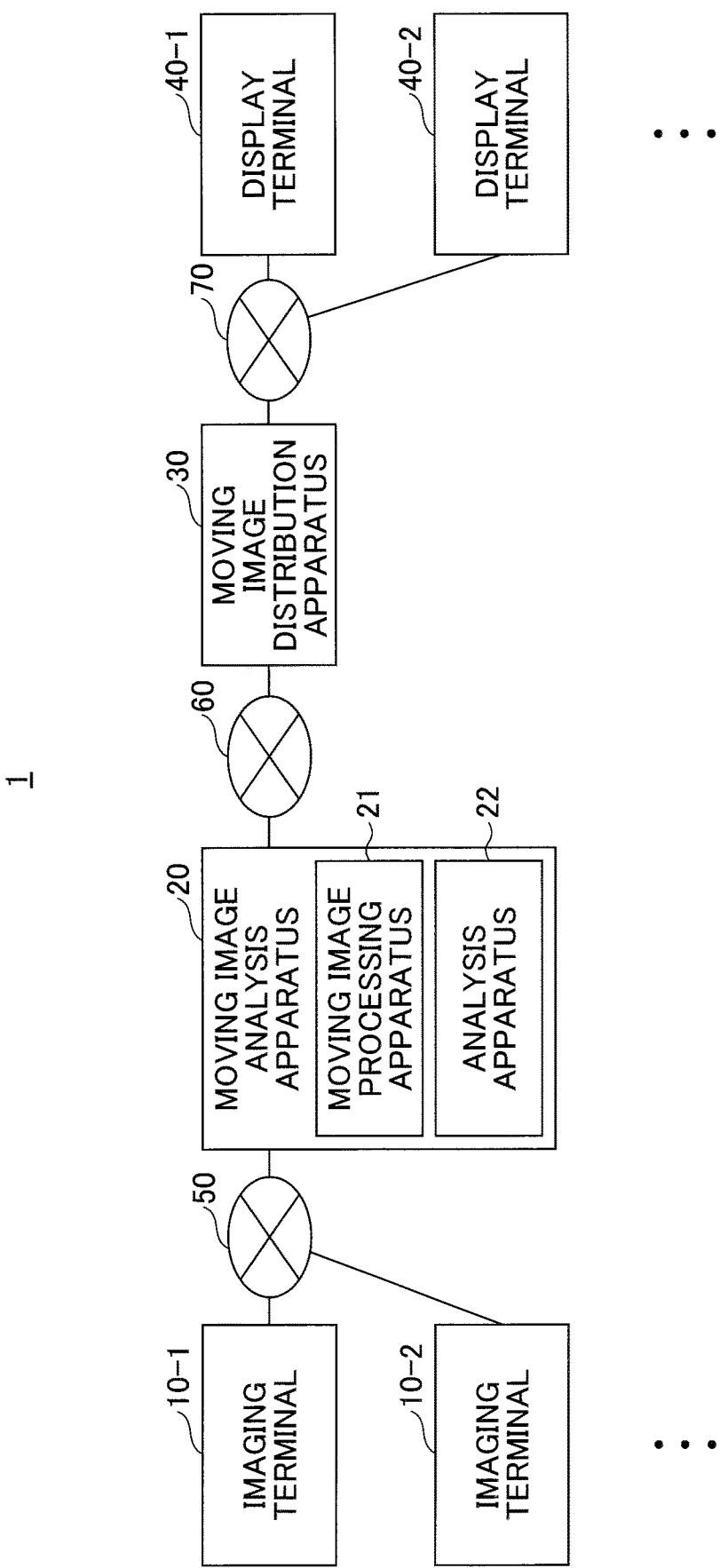
FIG. 1 is a drawing illustrating a configuration example of a communication system according to an embodiment.

FIG. 1 is a drawing illustrating a configuration example of a communication system 1 ("moving image processing system") according to an embodiment. In FIG. 1, the communication system 1 includes imaging terminals 10-1, 10-2, . . . (each of which will be hereinafter simply referred to as an "imaging terminal 10" in a case where it is not necessary to distinguish them from each other), a moving image analysis apparatus 20, a moving image distribution apparatus 30, and display terminals 40-1, 40-2, . . . (each of which may be hereinafter simply referred to as a "display terminal 40" in a case where it is not necessary to distinguish them from each other).

The imaging terminal 10 and the moving image analysis apparatus 20 are communicatively connected by a network 50. The moving image analysis apparatus 20 and the moving image distribution apparatus 30 are communicatively connected by a network 60. The moving image distribution apparatus and the display terminal 40 are communicatively connected by a network 70. Each of the network 50, the network 60, and the network 70 is a network such as, e.g., the Internet, a mobile phone network, a wireless local area network (wireless LAN), or a local area network (LAN).

The imaging terminal 10 is an information processing device (computer) such as, e.g., a surveillance camera, a video camera, a smartphone, or a moving image (video) file server. The imaging terminal 10 uses a predetermined method ("first method") to encode a moving image imaged by a camera and voice collected by a microphone. The imaging terminal 10 distributes the encoded moving image and audio to the moving image analysis apparatus 20 in real time by streaming and the like. Alternatively, the imaging terminal 10 accumulates the encoded moving image and audio as a file and uploads the file to the moving image analysis apparatus 20 at a predetermined timing.

The moving image analysis apparatus 20 includes a moving image processing apparatus 21 and an analysis apparatus 22.

For example, the moving image processing apparatus 21 is a transcoder that decodes a moving image that has been imaged and encoded by the imaging terminal 10, and encodes the moving image using a predetermined method ("second method"). The moving image processing apparatus 21 decodes and encodes the moving image and voice received from the imaging terminal 10, and outputs the encoded moving image and voice to the moving image distribution apparatus 30 in real time by streaming or the like. Alternatively, the moving image processing apparatus 21 accumulates the encoded moving image and audio as a file and uploads the file to the moving image distribution apparatus 30 at a predetermined timing. As a result, the moving image received from the imaging terminal 10 and encoded by various encoding methods can be converted into a predetermined encoding method and output to the moving image distribution apparatus 30.

Further, the moving image processing apparatus 21 detects feature data indicating a feature of a moving image when encoding the moving image. Note that the feature data may include data obtained by image processing or inference processing such as a position of a thing, a moving direction of a thing, and a moving speed of a thing, and may also include brightness, color, change in sound, volume of sound, and the like.

The moving image processing apparatus 21 causes the analysis apparatus 22 to detect an object on the basis of the feature data, adds the data of the detected object and the feature data to the moving image, and outputs the moving image to the moving image distribution apparatus 30.

For example, with AI (Artificial Intelligence) using moving images and data of objects received from the moving image processing apparatus 21, the moving image distribution apparatus 30 provides services such as moving image distribution, suspicious person monitoring, visitor management, store marketing, and moving image analysis. The moving image distribution apparatus may distribute moving images and audio received from the moving image processing apparatus 21 to the display terminal 40 in real time. The moving image distribution apparatus 30 may stop the distribution when a predetermined object is detected by the analysis apparatus 22.

The display terminal 40 is an information processing apparatus (computer) such as, e.g., a smartphone, a tablet terminal, or a personal computer. The display terminal 40 displays, on a screen, the moving image distributed from the moving image distribution apparatus 30.

<Hardware Configuration>
<<Moving Image Analysis Apparatus 20>>

Figure 2:
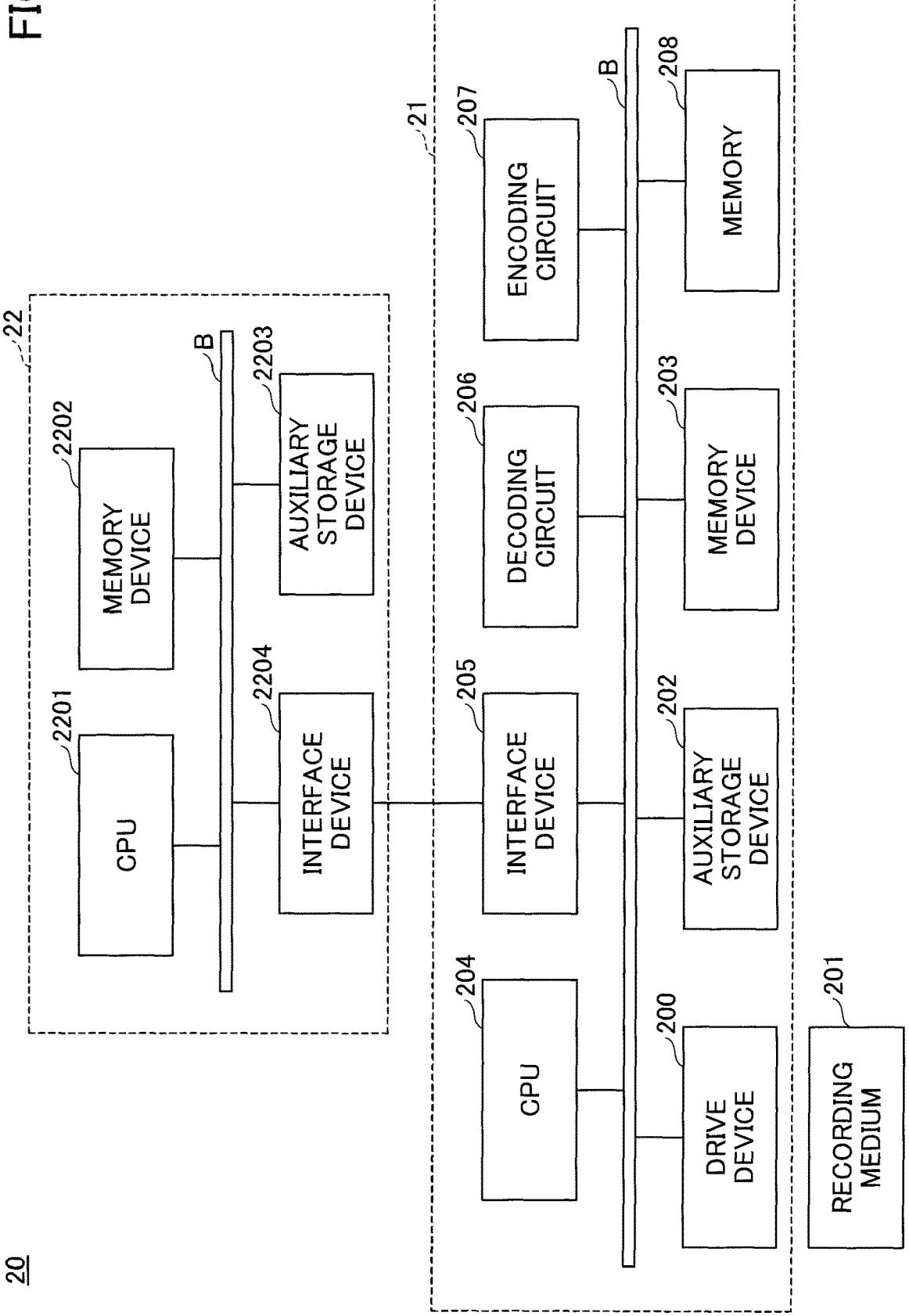
FIG. 2 is a drawing illustrating a hardware configuration example of a moving image analysis apparatus according to an embodiment.

FIG. 2 is a drawing illustrating a hardware configuration example of a moving image analysis apparatus 20 according to an embodiment. The moving image analysis apparatus 20 of FIG. 2 includes a moving image processing apparatus 21 and an analysis apparatus 22.

<<Moving Image Processing Apparatus 21>>

The moving image processing apparatus 21 includes a drive device 200, an auxiliary storage device 202, a memory device 203, a CPU (Central Processing Unit) 204, an interface device 205, a decoding circuit 206, an encoding circuit 207, a memory 208, and the like, which are connected with each other by a bus B.

A moving image processing program for implementing processing with the moving image processing apparatus 21 is provided by a recording medium 201. When the recording medium 201 recorded with the moving image processing program is set in the drive device 200, the moving image processing program is installed in the auxiliary storage device 202 from the recording medium 201 via the drive device 200. However, it is not always necessary to install the moving image processing program from the recording medium 201, and may be downloaded from another computer via the network. The auxiliary storage device 202 stores the installed moving image processing program as well as necessary files and data.

When an instruction to start the program is given, the program is read from the auxiliary storage device 202, and is stored to the memory device 203. The CPU 204 implements a function of the moving image processing apparatus 21 according to the program stored in the memory device 203. The interface device 205 is used as an interface for connecting to the network and the analysis apparatus 22.

For example, each of the decoding circuit 206 and the encoding circuit 207 is a circuit based on an LSI (Large Scale Integration), and the like, and the decoding circuit 206 and the encoding circuit 207 are dedicated circuits for performing decoding and encoding of moving images. When the encoding circuit 207 completes a generation of predetermined data used in encoding processing when the encoding circuit 207 encodes the moving image, the data is transferred from an internal memory of the encoding circuit 207 to the memory 208 using a method such as DMA (Direct Memory Access) and is stored in the memory 208. The CPU 204 uses the data stored in the memory 208 to generate feature data to be described later.

Examples of recording media 201 include portable recording media such as a CD-ROM, a DVD disk, or a USB memory. Examples of the auxiliary storage device 202 include an HDD (Hard Disk Drive), a flash memory, or the like. Both the recording medium 201 and the auxiliary storage device 202 correspond to computer-readable recording media. The memory 208 may use a part of the memory device 203.

<<Analysis Apparatus 22>>

For example, the analysis apparatus 22 is a board (card) to be used as an accelerator, and includes a CPU 2201, a memory device 2202, an auxiliary storage device 2203, an interface device 2204, and the like. The analysis apparatus 22 is connected to the moving image processing apparatus 21 via the interface device 205 according to an interface standard such as PCI Express. For example, when the analysis apparatus 22 is configured to be able to be retrofitted to the moving image processing apparatus 21, a secondary analysis processing function that improves the result of the primary analysis processing performed by the moving image processing apparatus 21 can be added or changed later.

<<Imaging Terminal 10 and Moving Image Distribution Apparatus 30>>

Figure 3:
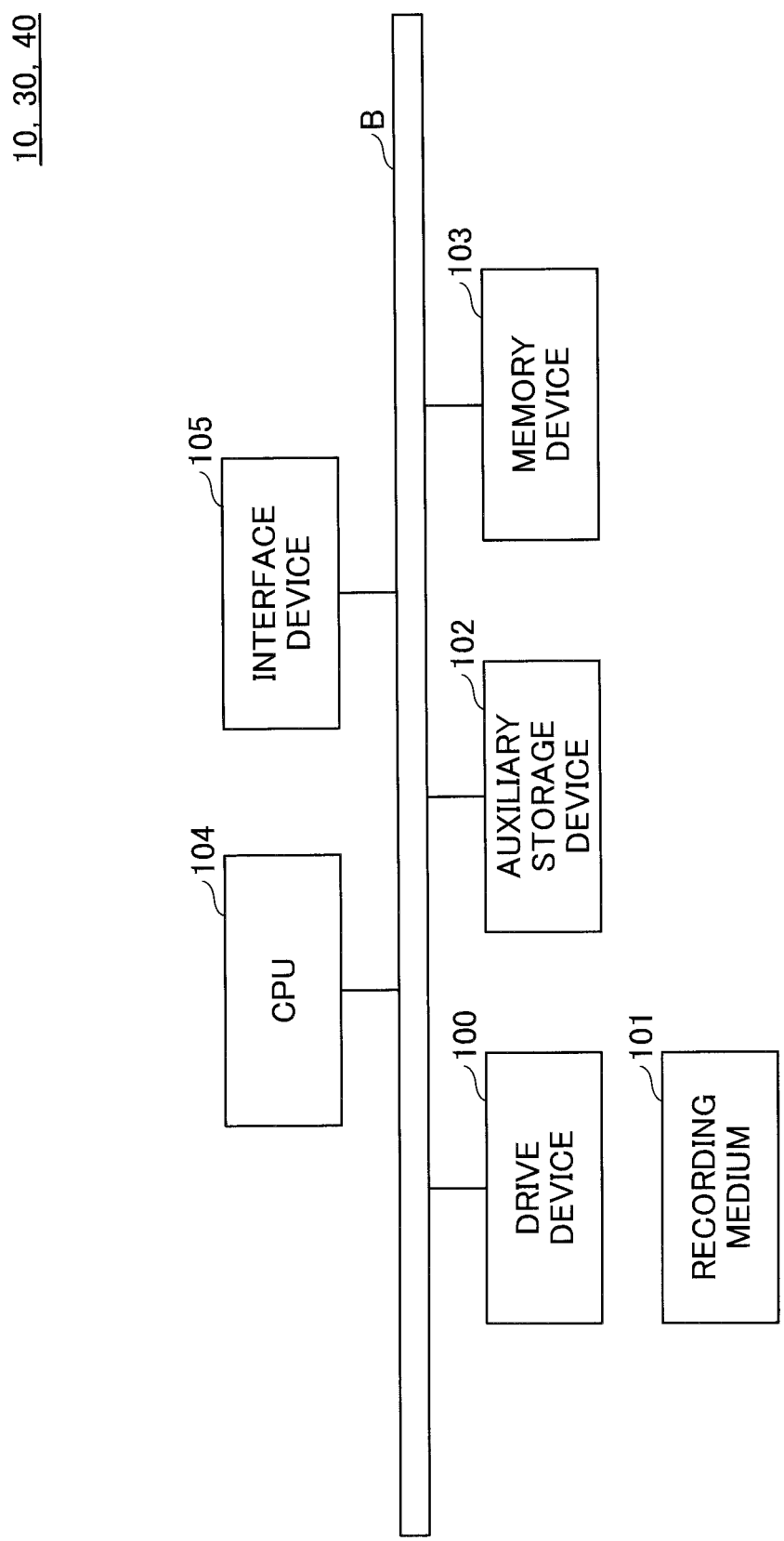
FIG. 3 is a drawing illustrating a hardware configuration example of an imaging terminal, a moving image distribution apparatus, and a display terminal according to an embodiment.

FIG. 3 is a drawing illustrating a hardware configuration example of an imaging terminal 10, a moving image distribution apparatus 30, and a display terminal 40 according to an embodiment. Hereinafter, the moving image distribution apparatus will be explained as an example. The moving image distribution apparatus 30 in FIG. 3 includes a drive device 100, an auxiliary storage device 102, a memory device 103, a CPU 104, an interface device 105, and the like, connected to each other by a bus B.

A moving image processing program for implementing processing with the moving image distribution apparatus 30 is provided by a recording medium 101. When the recording medium 101 recorded with the moving image processing program is set in the drive device 100, the moving image processing program is installed in the auxiliary storage device 102 from the recording medium 101 via the drive device 100. However, it is not always necessary to install the moving image processing program from the recording medium 101, and may be downloaded from another computer via the network. The auxiliary storage device 102 stores the installed moving image processing program as well as necessary files and data.

When an instruction to start the program is given, the program is read from the auxiliary storage device 102, and is stored to the memory device 103. The CPU 104 implements a function of the moving image distribution apparatus 30 according to the program stored in the memory device 103. The interface device 105 is used as an interface for connecting to the network.

Examples of the recording medium 101 include portable recording media such as a CD-ROM, a DVD disk, or a USB memory. Examples of the auxiliary storage device 102 include an HDD (Hard Disk Drive), a flash memory, or the like. Both the recording medium 101 and the auxiliary storage device 102 correspond to computer-readable recording media.

The hardware configuration of the imaging terminal 10 and the display terminal 40 may be similar to that of the moving image distribution apparatus 30. In addition to the hardware configuration illustrated in FIG. 3, the imaging terminal 10 has a camera (imaging apparatus) that images a moving image.

<Configuration>
<<Moving Image Analysis Apparatus>>

Figure 4:
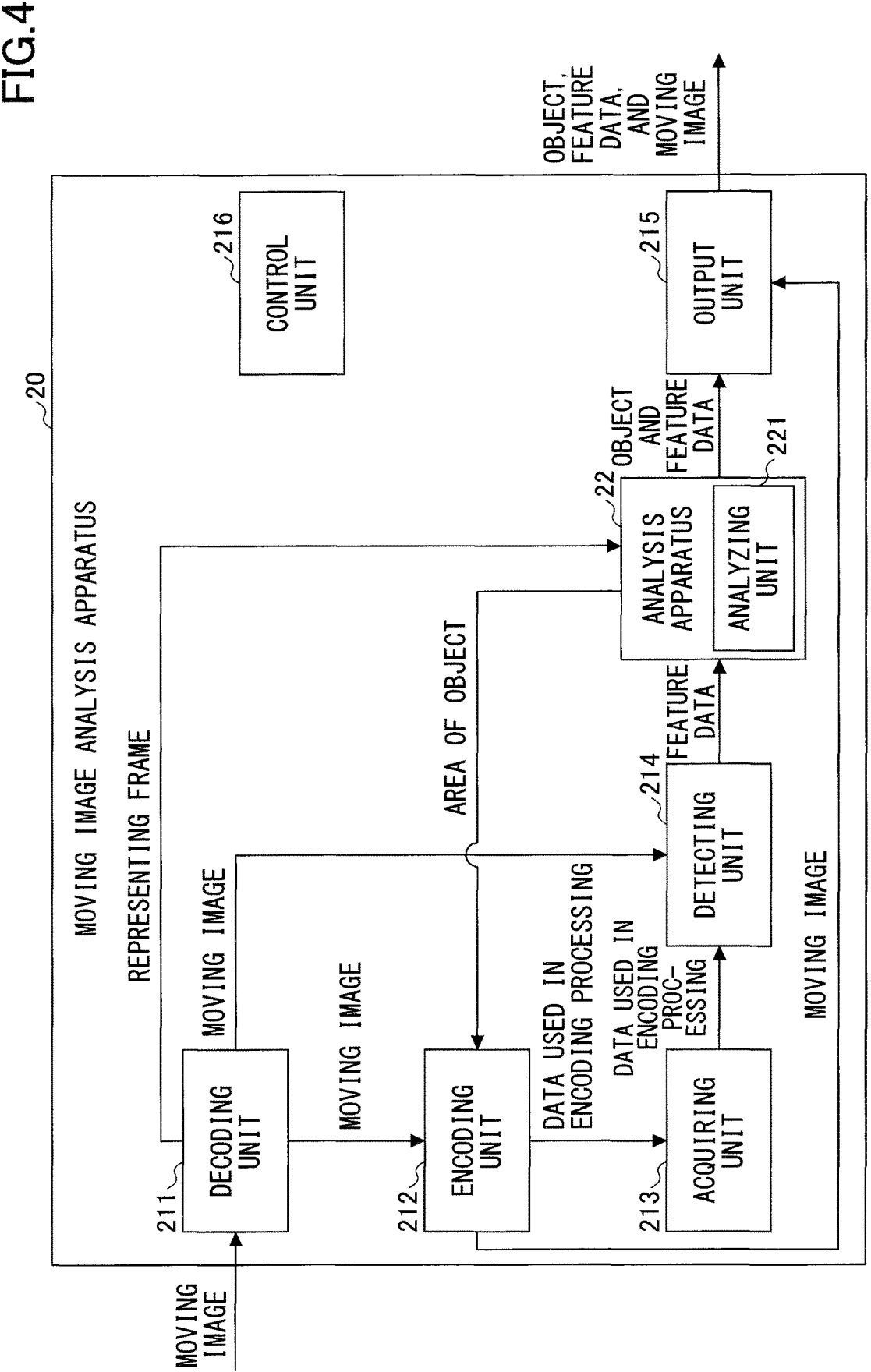
FIG. 4 is a drawing illustrating an example of a configuration block diagram illustrating a moving image analysis apparatus according to an embodiment.

Subsequently, a configuration of the moving image analysis apparatus 20 will be explained with reference to FIG. 4. FIG. 4 is a drawing illustrating an example of a configuration of the moving image analysis apparatus 20 according to an embodiment. The moving image analysis apparatus 20 includes a decoding unit 211, an encoding unit 212, an acquiring unit 213, a detecting unit 214, an output unit 215, and a control unit 216. The analysis apparatus 22 includes an analyzing unit 221.

The decoding unit 211 is implemented by the decoding circuit 206 illustrated in FIG. 2 or processing which one or more programs installed in the moving image processing apparatus 21 causes the CPU 204 of the moving image processing apparatus 21 to execute. When the decoding unit 211 is implemented by the CPU 204, the decoding circuit 206 illustrated in FIG. 2 may not be provided. In this case, the CPU 204 may be a multi-core processor, and decoding processing by the decoding unit 211 and processing for detecting feature data (meta data) by the detecting unit 214 may be processed in parallel using different cores.

Further, when the moving image analysis apparatus 20 receives a moving image of unencoded RAW data from the imaging terminal 10 via a video cable or the like, the moving image analysis apparatus 20 may not include the decoding unit 211.

The encoding unit 212 is implemented by using the encoding circuit 207 illustrated in FIG. 2. The acquiring unit 213 is implemented by using the memory 208 illustrated in FIG. 2.

The detecting unit 214, the output unit 215, and the control unit 216 are implemented by processing which one or more programs installed in the moving image processing apparatus 21 causes the CPU 204 of the moving image processing apparatus 21 to execute. The analyzing unit 221 is implemented by processing which one or more programs installed in the analysis apparatus 22 causes the CPU 2201 of the analysis apparatus 22 to execute.

The moving image analysis apparatus 20 may include circuits that implement the detecting unit 214, the output unit 215, the control unit 216, or the analyzing unit 221.

The decoding unit 211 decodes the moving image received from the imaging terminal 10.

The encoding unit 212 uses compression standards of moving images such as HEVC (High Efficiency Video Coding, H.265) and AVC (Advanced Video Coding, H.264) to compress frames of a moving image decoded by the decoding unit 211.

The acquiring unit 213 acquires data used in encoding processing in which the frames of a moving image are compressed and encoded by the encoding unit 212.

The detecting unit 214 detects feature data indicating feature of each frame of the moving image received from the imaging terminal 10 on the basis of each frame of the moving image and the data acquired by the acquiring unit 213. The feature data may include label information indicating a type of each object included in a processing target frame, information indicating an area (outline) of an object, information indicating movement of each object, information about a recognized background, or the like. Examples of label information include a stationary object, a moving thing, a person, a face, a vehicle, or the like.

The analyzing unit 221 detects an object included in a first frame on the basis of respective feature data detected from a plurality of frames by the detecting unit 214 and a second frame (representing frame) included in the plurality of frames, and outputs data of the detected object and the feature data used for the detection.

The output unit 215 outputs, to the moving image distribution apparatus 30, data obtained by encoding a moving image with the encoding unit 212, data of an object detected by the analyzing unit 221, and feature data. The output of data obtained by encoding a moving image, data of an object, and feature data from the output unit 215 to the moving image distribution apparatus 30 may be performed for each frame of the moving image, or may be performed for every multiple frames in a collective manner.

The control unit 216 performs overall control of the moving image analysis apparatus 20.

<<Moving Image Distribution Apparatus>>

Figure 5:
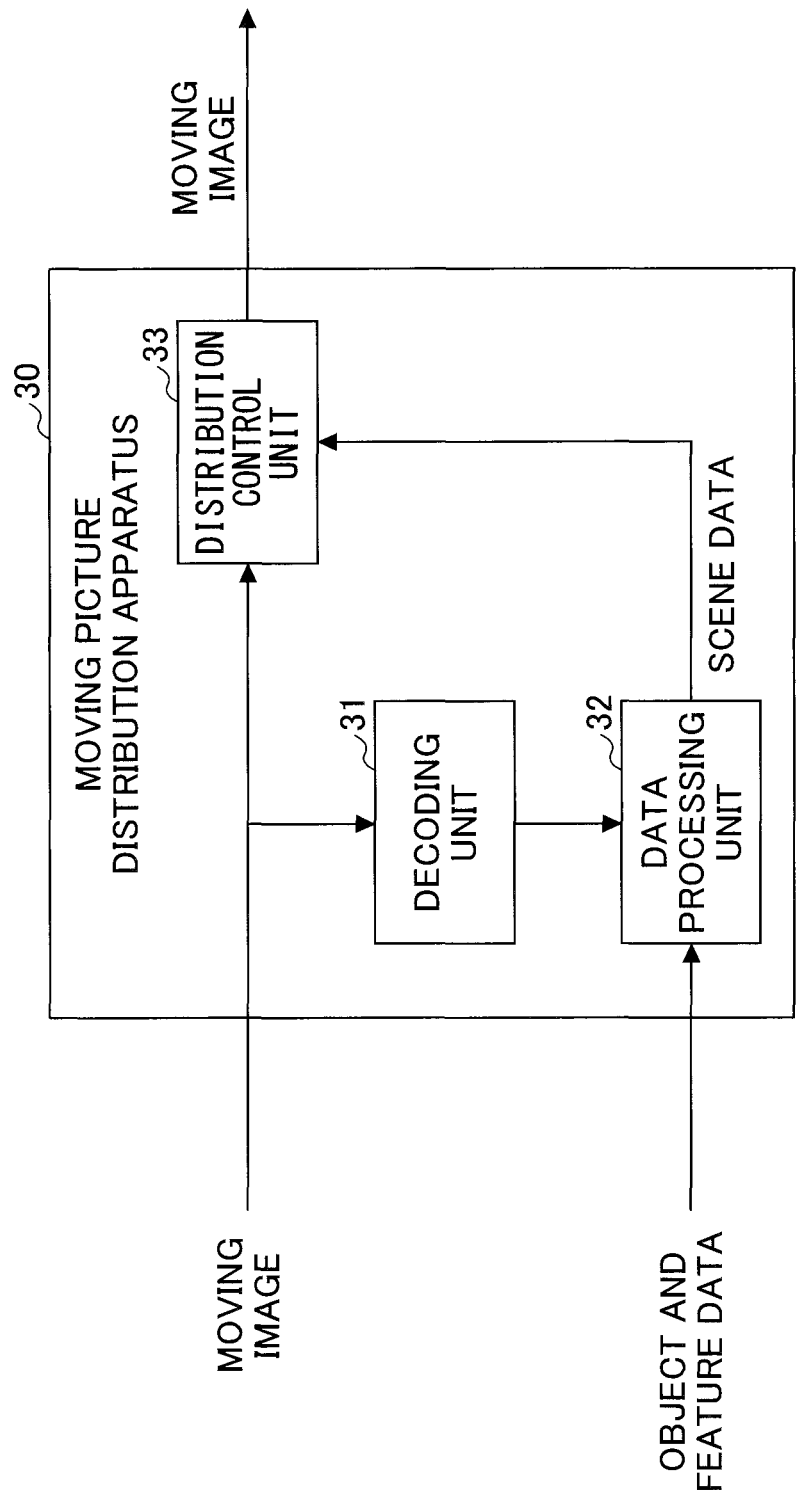
FIG. 5 is a drawing illustrating an example of a functional block diagram illustrating a moving image distribution apparatus according to an embodiment.

Subsequently, a functional configuration of the moving image distribution apparatus 30 will be explained with reference to FIG. 5. FIG. 5 is a drawing illustrating an example of a functional block diagram illustrating the moving image distribution apparatus 30 according to the embodiment. The moving image distribution apparatus 30 includes a decoding unit 31, a data processing unit 32, and a distribution control unit 33.

The decoding unit 31, the data processing unit 32, and the distribution control unit 33 are implemented by processing which one or more programs installed in the moving image distribution apparatus 30 causes the CPU 104 of the moving image distribution apparatus 30 to execute.

The decoding unit 31 decodes moving images and audio received from the moving image processing apparatus 21 as necessary.

The data processing unit 32 performs predetermined data processing by using the data of an object and the feature data received from the moving image processing apparatus 21 and a moving image decoded by the decoding unit 31. The data processing unit 32 performs, as predetermined data processing, for example, image processing of a higher load, audio processing, inference processing, and the like to extract a scene from a moving image, determines whether to permit distribution of the moving image on the basis of the extracted scene and the received object, and outputs the determination result to the distribution control unit 33. In the determination as to whether to permit distribution or not, in a case where a score of likelihood of being an object is equal to or more than a threshold value, the distribution of a moving image may be stopped, or in a case where an extracted scene or a received object corresponds to a distribution-stop target defined in advance, the distribution of the moving image may be stopped.

The distribution control unit 33 distributes a moving image to the display terminal 40, and controls the display of the moving image on the screen of the display terminal 40.

Blur processing or mask processing may be applied to some of the scenes and objects on the basis of a determination result as to whether distribution is permitted or not by the data processing unit 32, and thereafter, the CPU 104 may execute encoding processing on the partially blurred or masked moving image and output the encoded moving image to the distribution control unit.

<Processing>

(Processing for Detecting Object)

Figure 6:
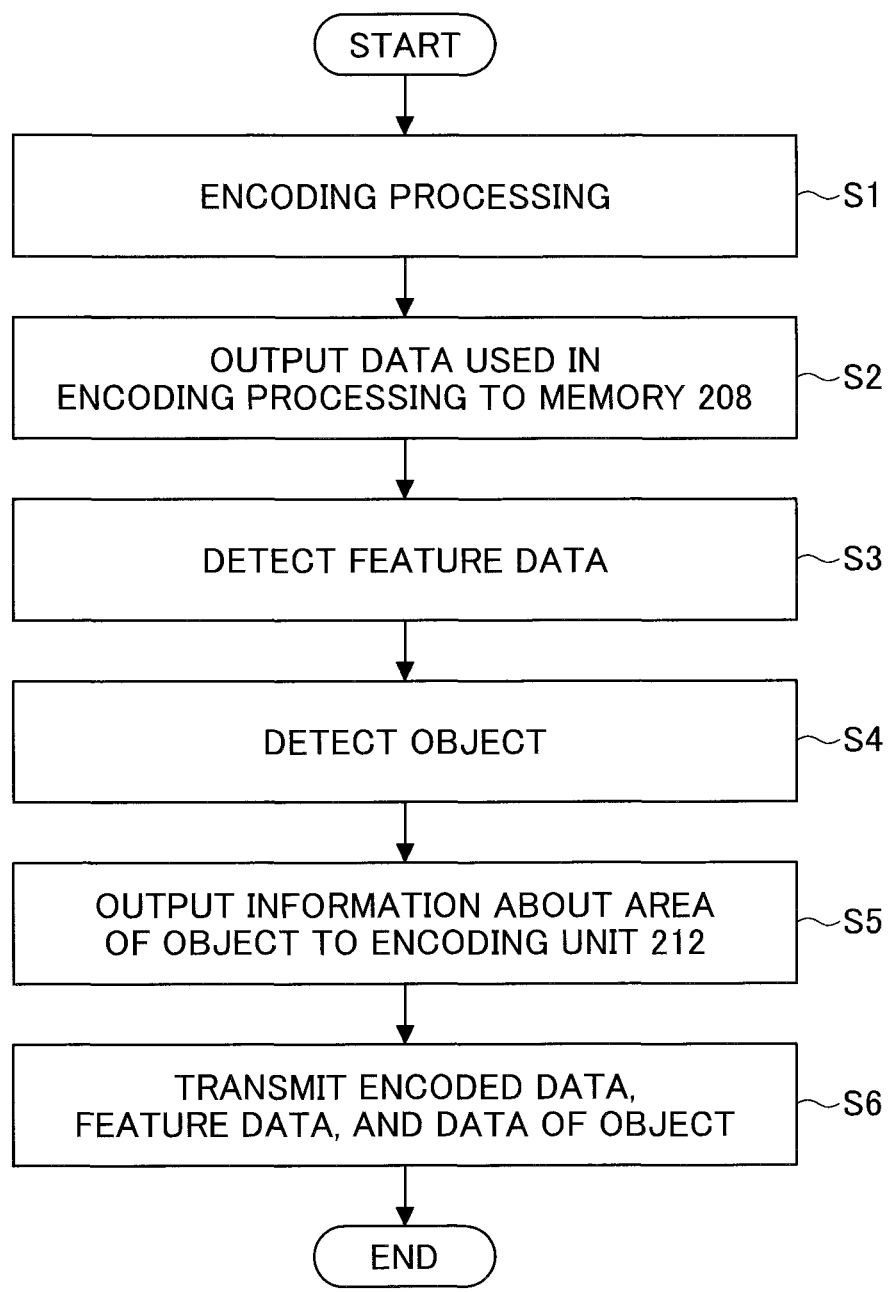
FIG. 6 is a flowchart illustrating an example of processing for detecting an object performed by a moving image analysis apparatus.

Subsequently, processing for detecting an object performed by the moving image analysis apparatus 20 will be explained with reference to FIG. 6. FIG. 6 is a flowchart illustrating an example of processing for detecting an object of the moving image analysis apparatus 20. It should be noted that the following processing is performed on each frame in a moving image. Hereinafter, any given frame in a moving image will be referred to as a processing target frame.

First, in step S1, the encoding unit 212 of the moving image processing apparatus 21 performs processing to compress and encode a processing target frame.

Subsequently, the encoding unit 212 of the moving image processing apparatus 21 outputs data used in encoding processing to the memory 208 (step S2). Here, data used in encoding processing is loaded from the encoding circuit 207 and stored to the memory 208 as illustrated in FIG. 2. Accordingly, the CPU 204 can refer to the data used in encoding processing stored in the memory 208. For example, the data used in encoding processing may include data of each block (CTU (Coding Tree Unit)) serving as a unit in which the encoding processing is performed, a reduced image of a frame, data indicating a change between a plurality of consecutive frames in a moving image (i.e., data indicating a motion of each block), data indicating an area in a same color, data of a contour in each block, and the like.

It should be noted that encoding processing in step S1 performed by the encoding unit 212 and detection processing performed by the detecting unit 214 are executed in parallel. The encoding processing performed by the encoding circuit 207 is processing performed by dedicated hardware, and therefore, for example, in a case where a real-time moving image is received from the imaging terminal by streaming, processing for encoding the processing target frame can be completed in about ⅒ of the length of time to perform the real-time reception.

Subsequently, the detecting unit 214 of the moving image analysis apparatus 20 uses data stored in the memory 208 to detect feature data indicating a feature of the moving image for the processing target frame (step S3). For example, the detecting unit 214 may detect feature data with AI (Artificial Intelligence) using machine learning such as deep learning. In this way, by using data used in the encoding processing, the processing load for detecting feature data for each processing target frame can be greatly reduced.

The processing of step S2 is performed during the encoding processing. In a case where the detection processing performed by the detecting unit 214 is configured to have such a processing load that the detection processing can be completed within a length of time to perform real-time reception of a moving image, feature data mean be detected in real time without reducing the processing performance of the encoding circuit 207.

Subsequently, the analyzing unit 221 of the analysis apparatus 22 detects an object on the basis of respective feature data detected from a plurality of frames, which are located before the processing target frame, detected by the detecting unit 214 of the moving image processing apparatus 21 (step S4). Alternatively, the analyzing unit 221 of the analysis apparatus 22 may detect an object on the basis of the respective feature data and a single frame included in the plurality of frames. In this case, the single frame included in the plurality of frames may be a frame with a recognition score about the type the object calculated as a relatively high value by the AI of the detecting unit 214.

For example, the analyzing unit 221 of the analysis apparatus 22 may detect an object with AI using machine learning such as deep learning. Also, for example, in a case where it can be detected, from respective feature data for a plurality of frames, that two or more persons face each other and one of the persons extends and retracts his or her arm toward another of the persons at a speed higher than a predetermine threshold value, and a condition that there is no other spectators around the persons is satisfied, the analyzing unit 221 of the analysis apparatus 22 may recognize at least the one of the persons as a predetermined object (i.e., a person inflicting violence in this case). The analyzing unit 221 of the analysis apparatus 22 may calculate a score indicating a likelihood of being a predetermined object, and may cause the output unit 215 to output the calculated score as predetermined data of the object.

By performing analysis based on feature data, objects can be detected at a higher speed than when objects are detected based on multiple frames in a moving image.

The analyzing unit 221 of the analysis apparatus 22 may detect an object based on some or all of the frames included in a moving image in addition to feature data. In such case, the detection accuracy can be improved as compared with the case where an object is detected based only on each frame included in a moving image.

Subsequently, the analyzing unit 221 of the analysis apparatus 22 outputs information indicating an area of an object to the encoding unit 212 of the moving image processing apparatus 21 (step S5). When the encoding unit 212 performs encoding of subsequent frames, the encoding unit 212 may perform encoding upon applying predetermined processing to the area of the object, or upon applying processing instructed by the analyzing unit 221, for example, replacing the area of the object with an image such as a background of the frame. Alternatively, the encoding unit 212 may perform encoding upon applying blur (mosaic) processing to the area of the object. In such case, the output of the frame in which the object appears can be stopped.

Subsequently, the output unit 215 of the moving image analysis apparatus 20 outputs, to the moving image distribution apparatus 30, the data obtained by encoding the moving image with the encoding unit 212, the feature data detected by the detecting unit 214 of the moving image analysis apparatus 20, and the data of the object detected by the analyzing unit 221 (step S6).

In a case where no object is detected in the processing of step S4, the output unit 215 outputs data obtained by encoding a moving image, and the processing of the processing target frame ends.

<Modification 1 in Case where Moving Images Taken by Multiple Cameras are Used>

The analyzing unit 221 of the analysis apparatus 22 may detect an object in a moving image received from one of a plurality of imaging terminals 10 on the basis of feature data indicating a feature of a moving image received from another of the plurality of imaging terminals 10. For example, in a case where a position and an attachment angle of each of the plurality of imaging terminals 10 are known in advance, and an object is detected on the basis of feature data and a frame of a moving image taken by an imaging terminal 10-1, the object may also be determined to be detected in a frame taken by an imaging terminal 10-2 at the same point in time.

For example, it is assumed that the analyzing unit 221 of the analysis apparatus 22 detects an object based on feature data from a first camera installed at a position relatively close to the object. In this case, even if a value indicating a relatively low score indicating the likelihood of being the object is calculated from feature data detected from a second camera installed at a position far away from the object, the analyzing unit 221 of the analysis apparatus 22 determines to detect the object.

<Modification 2 in Case Where Moving Image Taken by Multiple Cameras>

In a case where the analyzing unit 221 of the analysis apparatus 22 detects an object on the basis of feature data and a frame of a moving image taken by an imaging terminal 10-1, the analyzing unit 221 of the analysis apparatus 22 may cause the encoding unit 212 to perform encoding upon applying blur processing and the like to subsequent frames taken by an imaging terminal 10-2.

<Example of Detection Processing of Feature Data>

Hereinafter, an example of processing for detecting feature data will be explained. It should be noted that the following examples may be combined as appropriately and carried out.

<<Example 1 of Detection Processing of Feature Data>>

Feature data of a structure other than a background or feature data of a background is detected at a relatively high speed by using CTU (Coding Tree Unit) (an example of "data used in processing in which a moving image is compressed and encoded" and an example of "block") obtained in encoding processing such as HEVC and the like will be explained as Example 1 of detection processing of feature data.

The encoding unit 212 uses HEVC and the like to perform encoding processing of each frame (picture) in a moving image in units of square pixel blocks referred to as CTUs. In HEVC and the like, the size of each block in a frame is determined according to presence of a contour in a frame image and complexity of the contour.

Figure 7:
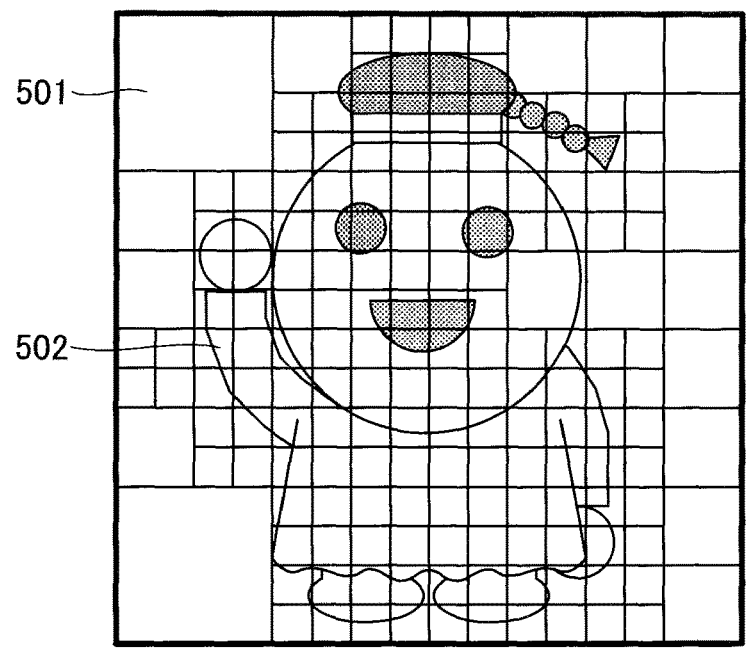
FIG. 7 is a drawing for explaining an example of CTUs.

FIG. 7 is a drawing for explaining an example of CTUs. As illustrated in FIG. 7, a flat background part is divided into relatively large blocks (CBs, Coding Blocks) 501. A contour of a thing is divided into relatively small blocks 502.

The encoding unit 212 stores the CTU data in the memory 208 when the block division processing for determining the CTUs is completed. The data of the CTUs stored in the memory 208 includes data such as a hierarchical structure of CTBs (Coding Tree Blocks), a CB size, and neighboring CTBs. Each CTB is a block of a constituting color component signal.

The detecting unit 214 may use the data of CTUs stored in the memory 208 as feature data. In this case, for example, by using feature data, which is CTU data, backgrounds such as sky and walls can be distinguished from an object having a structure of a person, a building, and the like, and data of which composition is similar can be extracted from the stored data.

Further, for example, the detecting unit 214 may detect an area of each object in an image using the data of the CTU, and the data of the detected area may be used as feature data.

In this case, for example, in a case where the detecting unit 214 is to detect a person and the like, the detecting unit 214 may preferentially search for an area in which the CB size is less than or equal to a predetermined value, and execute processing to detect a face. As a result, for example, when moving images are analyzed in real time, the accuracy of processing for detecting an object such as a person can be improved and the processing can be performed at a higher speed. In this case, a known algorithm may be used as an algorithm for detecting a person or the like. Further, only an area in which the CB size is equal to or less than a predetermined value (for example, 16 by 16) may be adopted as a search area using the CTU data. As a result, the detection can be performed at a higher speed than a conventional method in which the entire image is searched.

When the detecting unit 214 is to detect a background such as sky, road, and the like, the detecting unit 214 may execute processing to detect a background by adopting an area in which the CB size is equal to or more than a predetermined value (for example, 32 by 32) as a search area.

<<Example 2 of Detection Processing of Feature Data>>

As Example 2 of detection processing of feature data, an example of detecting feature data about a motion of a thing at a relatively high speed by using a reduced image (an example of "data used in processing in which a moving image is compressed and encoded") obtained during encoding processing will be explained.

In HEVC, AVC, and the like, a reduced image (a predicted image) of each frame is generated for motion compensation. When the encoding unit 212 generates a reduced image for motion compensation, data of the generated reduced image is stored in the memory 208.

The detecting unit 214 may use data of reduced image stored in the memory 208 as feature data. As a result, for example, the moving image distribution apparatus 30 can use the feature data for motion search and the like.

Further, for example, the detecting unit 214 may detect a motion of each object in an image using the data of the reduced image, and adopt the data of the detected motion as feature data. In this case, for example, the detecting unit 214 derives candidates of a plurality of search start areas, selects a search start area of a high similarity from among the plurality of candidates, and adopts the selected start area as feature data. The moving image distribution apparatus 30 can search a search start point included in the feature data and its surroundings in detail using the same size image.

<<Example 3 of Detection Processing of Feature Data>>

As Example 3 of detection processing of feature data, an example of detecting feature data about a motion of a thing at a relatively high speed by using data indicating a change between a plurality of consecutive frames obtained in encoding processing (i.e., data indicating a motion of a block, an example of "data used in processing in which a moving image is compressed and encoded") will be explained.

In HEVC, AVC, and the like, data indicating a change between a plurality of consecutive frames is generated for motion compensation. Examples of data indicating a change between frames includes differences, motion vectors, and the like.

The difference is a sum of absolute difference (SAD), a sum of squared difference (SSD), a sum of absolute transformed difference (SATD), and the like, between values of luminance and color difference of each pixel in a predetermined range included in a current frame and values of luminance and color difference of each pixel in the predetermined range included in a previous frame. The motion vector is data indicating a movement direction of an encoding target block predicted between consecutive frames.

In HEVC and AVC, motion compensation prediction is performed for each prediction block (PU).

Figure 8A:
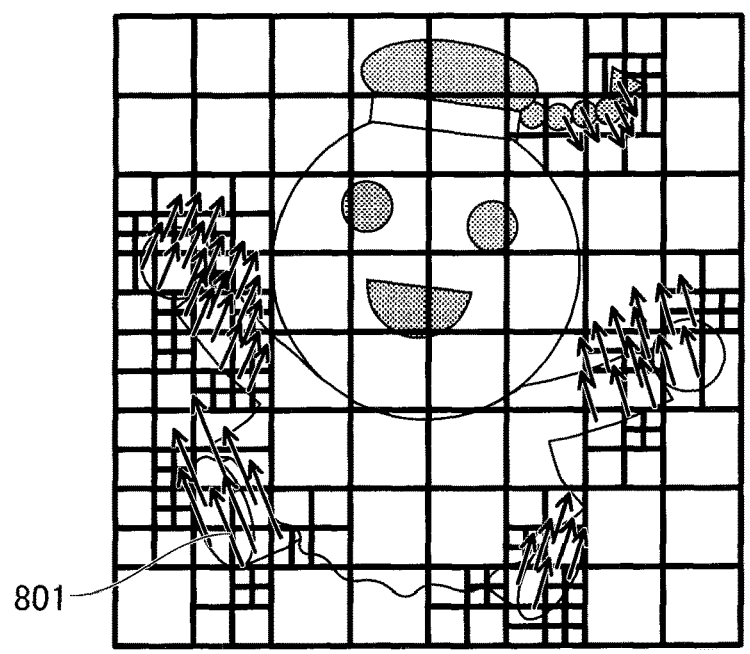
FIG. 8A is a drawing for explaining motion vectors in HEVC.
Figure 8B:
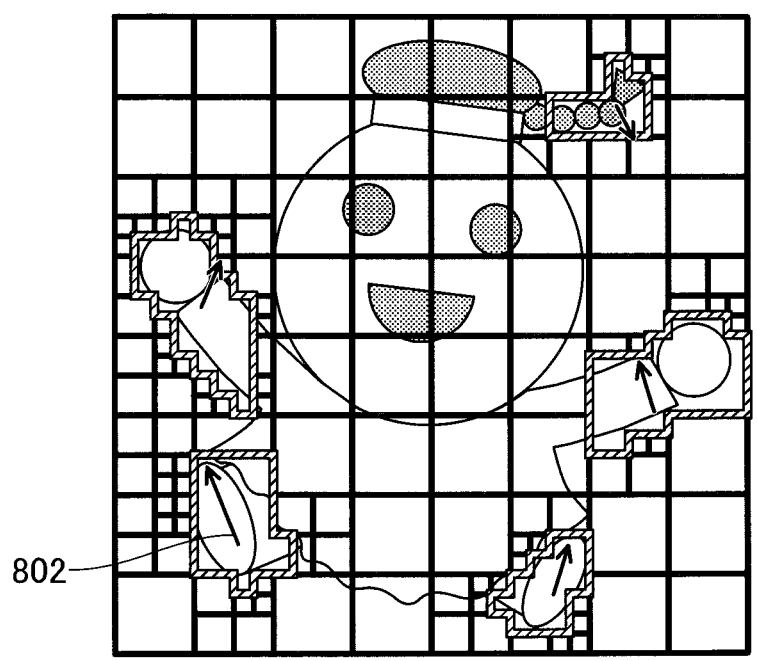
FIG. 8B is a drawing for explaining motion vectors in HEVC.

FIG. 8A and FIG. 8B are drawings for explaining motion information in HEVC. Since neighboring prediction blocks are considered to have similar movements, in HEVC, encoding is performed by integrating motion vectors of neighboring prediction blocks instead of encoding a separate motion vector for each prediction block. In the example of FIG. 8A, a motion vector for each prediction block is indicated by an arrow 801 or the like. In the example of FIG. 8B, an integrated motion vector obtained by integrating motion vectors of neighboring prediction blocks is indicated by an arrow 802 or the like.

When the encoding unit 212 generates the data for motion compensation, the generated data is stored in the memory 208.

The detecting unit 214 may use the data stored in the memory 208 as feature data. As a result, for example, the moving image distribution apparatus 30 can use the feature data for motion search and the like.

Further, for example, the detecting unit 214 may detect a motion of each object in an image using the data, and may use the data of the detected motion as feature data. In this case, in a case where the encoding unit 212 integrates motions of a set of prediction blocks which are as many as a predetermined number or more and in which the size of each prediction block is equal to or less than a predetermined value, the detecting unit 214 may preferentially search an area of each prediction block included in this set of prediction blocks. As a result, for example, in a case where a moving image is analyzed in real time, the accuracy of processing for detecting a moving thing can be improved, and the processing can be performed at a higher speed.

<<Example 4 of Detection Processing of Feature Data>>

As Example 4 of detection processing of feature data, an example of detecting feature data about complexity at a relatively high speed by using data indicating complexity of a frame (an example of "data used in processing in which a moving image is compressed and encoded") obtained in encoding processing will be explained.

Data of a sum of absolute difference (SAD), a sum of absolute transformed difference (SATD), and the like of luminance and color difference in a single frame is calculated in intra prediction of HEVC, AVC, and the like.

When the encoding unit 212 generates the data in intra prediction, the generated data is stored in the memory 208. The detecting unit 214 may adopt the data stored in the memory 208 as feature data.

According to the detection processing of feature data described above, for example, a surveillance camera system, which monitors a moving image and audio from a surveillance camera, can detect feature data about a position and a size of a face in the moving image, recognition of a person in the moving image, estimated information about age and sex of a person, color of clothes worn by a person, possessions such as glasses, a hat, a bag, and the like.

Also, in a case where, e.g., an installation position and an orientation of a camera, an angle of view, distortion, and property of a lens are known, or in a case where a camera is calibrated in advance with a marker and the like, feature data about the size of a person in a moving image and a distance from the person to the camera can be detected.

In addition, a movement of a recognized person or a thing can be tracked, and feature data of action or movement as to what kind of movement a person has performed can be detected. In this case, the feature data may include, for example, information such as a face and a body, a direction of feet, movement of hands and feet, a position of each joint, (facial expression), and information about action and movement estimated in view of the above. The information may be detected from every few frames or with every few seconds.

In addition, actions in a relatively wide range may be detected from moving images taken by a plurality of cameras, the range of the detected actions may be adopted as feature data. Accordingly, a track of movement of a person or a thing can be displayed on a terminal of a user.

<Modification 1>

Instead of being implemented by using the encoding circuit 207 illustrated in FIG. 2, the encoding unit 212 may be implemented by processing which one or more programs installed in the moving image processing apparatus 21 causes the CPU 204 of the moving image processing apparatus 21 to execute.

<Modification 2>

In the above-described example, the example in which the moving image analysis apparatus 20 performs encoding upon performing processing such as blur in the processing of step S5 has been described. Instead, after the display terminal 40 decodes a moving image, the display terminal 40 may display the moving image on a screen after performing processing such as blur on the moving image. In this case, for example, the moving image distribution apparatus 30 may distribute, to the display terminal 40, data obtained by encoding a moving image and data of an object received from the moving image analysis apparatus 20, and the display terminal 40 may perform image processing such as, e.g., blurring an area of the object.

<Modification 3>

For example, the detecting unit 214 of the moving image processing apparatus 21 and the analyzing unit 221 of the analysis apparatus 22 may perform machine learning on the basis of a judgement result judged by a user of the display terminal 40. In this case, for example, the detecting unit 214 and the analyzing unit 221 obtain, as training data for supervised learning, the judgement result judged by the user of the display terminal 40 from the moving image distribution apparatus 30, and perform machine learning such as deep learning.

<Modification 4>

The moving image distribution apparatus 30 may store information about an object detected by the analyzing unit 221 of the analysis apparatus 22 in association with each frame of a moving image.

FIG. 9A is a drawing for explaining an example of scene data 901. FIG. 9B is a drawing for explaining an example of object data 902. The scene data 901 and the object data 902 stored in the moving image distribution apparatus 30 contain data about an object and the like, associated with each frame of a moving image, detected by the analyzing unit 221 of the analysis apparatus 22.

In the example of FIG. 9A, the scene data 901 contains fields of "scene", "object ID", "location", "action", "emotion", and the like as data about an object in association with a section of a frame. The "scene" is a unit indicating a content of a moving image. The "scene" is divided according to an action of an object in a section, and a change of an environment in each frame. The "object ID" is identification information about an object in a section. The "location" is information indicating a location where a moving image is taken in a section. The "action" is information indicating an action of an object in a section. The "emotion" is information indicating emotion of an object in a section.

In the example of FIG. 9B, the object data 902 contains data about "name", "age", "sex", and the like in association with an "object ID". The "name" is a name of an object. The "age" is an age of an object. The "sex" is a sex of an object. The objects not only include persons but also material things. Since information about objects detected by the analyzing unit 221 of the analysis apparatus 22 is stored, for example, posted moving images can be easily classified and easily searched.

<Other>

Conventionally, in a case where a moving image distributed by a user in real time contains an object that infringes copyright, an object that violates public order and morals, or an inappropriate object such as a person inflicting violence, an observer manually performs visual checking of the moving image to stop distribution of the moving image.

According to the above embodiment, a moving image is compressed, and an object is detected by using data used in the encoding processing. As a result, processing for detecting an object from the moving image can be performed at a relatively high speed. Therefore, for example, when a moving image is distributed in real time, an object inappropriate for distribution can be detected at a high speed or with high accuracy.

The above embodiment can be applied to, e.g., a surveillance camera system recognizing a person from an image, a digital marketing system for performing analysis such as whether a customer has picked up a product in a store or whether a customer has purchased the product or not, an IP distribution system, an AR or VR system for displaying information about a subject by superimposing the information on a moving image.

Although the embodiment of the present invention has been hereinabove described in detail, the present invention is not limited to such a specific embodiment, and various modifications and changes can be made within the range of the gist of the present invention described in claims.

For example, each functional unit of the moving image analysis apparatus 20 may be implemented by cloud computing constituted by one or more computers. Alternatively, the moving image analysis apparatus 20 and the moving image distribution apparatus 30 may be configured as an integrated apparatus. The moving image analysis apparatus 20 and the imaging terminal 10 may be configured as an integrated apparatus. In this case, the moving image processing apparatus 21 does not have to perform moving image decoding processing. The moving image analysis apparatus 20 may have at least some of the functional units of the imaging terminal 10 or the moving image distribution apparatus 30.

For example, instead of a configuration in which the analysis apparatus 22 is included in the same casing as the moving image processing apparatus 21, the analysis apparatus 22 may be configured as an independent apparatus, or may be configured to be in the same casing as the moving image distribution apparatus 30.

The moving image distribution apparatus 30 is an example of an "information processing apparatus". The detecting unit 214 is an example of a "first detecting unit". The analyzing unit 221 is an example of a "second detecting unit".

According to an aspect, processing for detecting an object from a moving image can be performed at a relatively high speed.

What is claimed is:

1. A moving image analysis apparatus comprising:
at least one of a processor and a circuitry configured to perform operations including:
encoding a moving image to yield encoded data;
acquiring first data and second data used in the encoding, in which the moving image is compressed and encoded, for a first frame and a second frame, respectively, included in the moving image;
detecting first feature data indicating a first feature of the moving image on the basis of the first frame and the first data and detecting second feature data indicating a second feature of the moving image on the basis of the second frame and the second data;
detecting an object included in the first frame on the basis of the first feature data and the second feature data; and
outputting the encoded data, data of the detected object, the first feature data, and the second feature data to a moving image distribution apparatus,
wherein the first data and the second data include either a block serving as a unit in which the moving image is encoded or a reduced image of a frame included in the moving image, or include both.

2. The moving image analysis apparatus according to claim 1, wherein the detecting the object further comprises detecting the object using machine learning.

3. The moving image analysis apparatus according to claim 1, wherein in the encoding in which the moving image is compressed and encoded, at least a part of an area of the object in a third frame included in the moving image is encoded by replacing an image of the at least the part of the area with another image or by blurring the image of the at least the part of the area.

4. The moving image analysis apparatus according to claim 1, wherein the first data and the second data further include data indicating a change between a plurality of consecutive frames in the moving image.

5. The moving image analysis apparatus according to claim 1, wherein the first feature data and the second feature data include at least one of data indicating an area of the object, data indicating a motion of the object, and data indicating a type of the object.

6. A moving image analysis system comprising:
a moving image processing apparatus; and
an analysis apparatus, wherein:
the moving image processing apparatus includes at least one of a processor or a circuitry configured to perform operations comprising:
encoding a moving image to yield encoded data;
acquiring first data and second data used in the encoding, in which the moving image is compressed and encoded, for a first frame and a second frame, respectively, included in the moving image;
detecting first feature data indicating a first feature of the moving image on the basis of the first frame and the first data and detecting second feature data indicating a second feature of the moving image on the basis of the second frame and the second data; and
outputting the encoded data, data of the detected object, the first feature data, and the second feature data to a moving image distribution apparatus,
the analysis apparatus includes at least one of a processor or a circuitry configured to perform operations comprising:
detecting the object included in the first frame on the basis of the first feature data and the second feature data, and the first data and the second data include either data of a block serving as a unit in which the moving image is encoded or a reduced image of a frame included in the moving image, or include both.

7. A moving image analysis method executed by a moving image analysis apparatus, comprising:
   encoding a moving image to yield encoded data;
   acquiring first data and second data used in the encoding, in which the moving image is compressed and encoded, for a first frame and a second frame, respectively, included in the moving image;
   detecting first feature data indicating a first feature of the moving image on the basis of the first frame and the first data and detecting second feature data indicating a second feature of the moving image on the basis of the second frame and the second data;
   detecting an object included in the first frame on the basis of the first feature data and the second feature data; and
   outputting the encoded data, data of the detected object, the first feature data, and the second feature data to a moving image distribution apparatus,
   wherein the first data and the second data include either data of a block serving as a unit in which the moving image is encoded or a reduced image of a frame included in the moving image, or include both.

8. A non-transitory computer-readable recording medium recorded with a program executable by a processor of a moving image analysis apparatus, the program causing the processor to perform operations comprising:
   encoding a moving image to yield encoded data;
   acquiring first data and second data used in the encoding, in which the moving image is compressed and encoded, for a first frame and a second frame, respectively, included in the moving image;
   detecting first feature data indicating a first feature of the moving image on the basis of the first frame and the first data and detecting second feature data indicating a second feature of the moving image on the basis of the second frame and the second data;
   detecting an object included in the first frame on the basis of the first feature data and the second feature data; and
   outputting the encoded data, data of the detected object, the first feature data, and the second feature data to a moving image distribution apparatus,
   wherein the first data and the second data include either data of a block serving as a unit in which the moving image is encoded or a reduced image of a frame included in the moving image, or include both.

9. The moving image analysis apparatus according to claim 1, wherein the first data and the second data are data of the block serving as a unit in which the moving image is encoded.

10. The moving image analysis apparatus according to claim 1, wherein each of the first data and the second data is the reduced image of a frame included in the moving image.

11. The moving image analysis apparatus according to claim 1, wherein the first data and the second data include data of a Coding Tree Block serving as a unit in which the moving image is compressed and encoded.

12. The moving image analysis apparatus according to claim 1, wherein the first data and the second data include at least one of: a hierarchical structure of Coding Tree Blocks; a size of a Coding Block; and neighboring Coding Tree Blocks.

* * * * *